US006987586B2

(12) United States Patent
Bogdanowicz et al.

(10) Patent No.: US 6,987,586 B2
(45) Date of Patent: Jan. 17, 2006

(54) METHOD OF DIGITAL PROCESSING FOR DIGITAL CINEMA PROJECTION OF TONE SCALE AND COLOR

(75) Inventors: Mitchell J. Bogdanowicz, Spencerport, NY (US); Carlo V. Hume, Fairport, NY (US); Charles P. Hagmaier, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 807 days.

(21) Appl. No.: 09/797,891

(22) Filed: Mar. 2, 2001

(65) Prior Publication Data

US 2002/0163657 A1 Nov. 7, 2002

(51) Int. Cl.
*G06F 15/00* (2006.01)

(52) U.S. Cl. ...................................................... 358/1.9
(58) Field of Classification Search .................. 358/1.9
See application file for complete search history.

(56) References Cited

U.S. PATENT DOCUMENTS

| | | | | |
|---|---|---|---|---|
| 4,839,721 A | | 6/1989 | Abdulwahab et al. ......... | 358/80 |
| 4,992,861 A | | 2/1991 | D'Errico ....................... | 358/75 |
| 5,140,414 A | | 8/1992 | Mowry .......................... | 358/81 |
| 5,189,511 A | | 2/1993 | Parulski et al. ............... | 358/80 |
| 5,191,645 A | * | 3/1993 | Carlucci et al. ............. | 715/723 |
| 5,239,370 A | | 8/1993 | Yamaguchi ................... | 358/518 |
| 5,249,056 A | * | 9/1993 | Gunday et al. ................ | 348/97 |
| 5,319,465 A | | 6/1994 | Squyres et al. .............. | 358/310 |
| 5,335,013 A | | 8/1994 | Faber ........................... | 348/104 |
| 5,374,954 A | | 12/1994 | Mowry ......................... | 348/121 |
| 5,406,326 A | | 4/1995 | Mowry ......................... | 348/104 |
| 5,457,491 A | | 10/1995 | Mowry ......................... | 348/104 |
| 5,475,425 A | | 12/1995 | Przyborsi et al. ........... | 348/239 |
| 5,579,031 A | * | 11/1996 | Liang .......................... | 345/604 |
| 5,641,596 A | | 6/1997 | Gray et al. .................... | 430/21 |
| 5,644,674 A | | 7/1997 | Aihara et al. ................. | 386/52 |
| 5,646,750 A | | 7/1997 | Collier ........................ | 358/518 |
| 5,687,011 A | | 11/1997 | Mowry ......................... | 358/527 |
| 5,729,363 A | | 3/1998 | Aihara et al. ............... | 358/906 |
| 5,754,682 A | | 5/1998 | Katoh ......................... | 382/162 |
| 5,809,164 A | | 9/1998 | Hultgren, III ............... | 382/162 |
| 5,831,673 A | | 11/1998 | Przyborski et al. ......... | 348/239 |
| 5,859,951 A | | 1/1999 | Aihara et al. ............... | 386/107 |

OTHER PUBLICATIONS

"Digital Color Management" Encoding Solutions by Edward J. Giorgianni and Thomas E. Madden. Addison-Wesley, 1998. pp. 64-66.

(Continued)

*Primary Examiner*—Kimberly Williams
*Assistant Examiner*—Charlotte M. Baker
(74) *Attorney, Agent, or Firm*—Stephen H. Shaw (57) ABSTRACT

A method for processing a sequence of digital image signals in order to match the appearance of a particular display medium, such as a motion picture print film, includes the steps of (a) converting the digital image signals into signal values in an analytical dye amount space where the signal values are proportional to a dye set corresponding to the particular medium; and (b) converting the signal values in analytical dye amount space into output values suitable for a display device, such as a digital projector. Moreover, the signal values in analytical dye amount space may be corrected for viewing conditions, such as printing flare, gamma, contrast ratio or neutrality.

30 Claims, 9 Drawing Sheets

OTHER PUBLICATIONS

"The HDTV Camcorder and the March to Marketplace Reality" by Laurence J.Thorpe, Fumio Nagumo, and Kazuo Ike. SMPTE Journal, Mar. 1998, pp. 164-177.

"A Simplified Motion-Picture Laboratory Control Method for Improved Color Duplication" by John P. Pytlak and Alfred W. Fleischer. SMPTE Journal, vol. 85, Oct. 1976, pp. 781-786.

"Digital Film Scanning and Recording: The Technology and Practice" by Glenn Kennel. SMPTE Journal, Mar. 1994, pp. 174-181.

U.S. Appl. No. 09/697,800, filed Oct. 27, 2000, Guimaraes et al.

U.S. Appl. No. 09/712,500, filed Nov. 14, 2000, Cirulli et al.

* cited by examiner

METHOD OF DIGITAL PROCESSING FOR DIGITAL CINEMA PROJECTION OF TONE SCALE AND COLOR

FIELD OF THE INVENTION

The present invention relates generally to the field of video processing or digital image processing to emulate motion picture film tonescale and color. More specifically, the invention relates to rendering an electronic image to emulate a film system reproduction, that is, to provide the appearance of an image captured and displayed with motion picture film.

BACKGROUND OF THE INVENTION

The digital era that is now upon us has the potential to change the way everyone operates in the motion picture field. The traditional method for projecting motion picture film was relatively simple because there were not very many options available to be controlled. Basically, film has a certain appearance or "look" that can be altered by processing, lighting and laboratory methods. The digital age has brought to the motion picture industry the ability to capture a motion picture print image and structure it in the form of data. Once the data has been captured, it can be manipulated practically to any degree that is desired. However, the more variables one has to work with, the harder it is to maintain or reconstruct the original intent.

In the prior art, digital image processing has taken place on variables associated with video images, as described in U.S. Pat. Nos. 5,335,013, 5,475,425 and 5,831,673, in order to emulate the broadcast look of film or the look of film after it has been through a telecine transfer. These patents describe systems for rendering the output of a video camera to simulate the visual appearance of motion picture film that has been transferred or converted to a video signal to be output directly for television broadcasting or recording on video tape. Further, the above-cited prior art teaches the alteration of the apparent contrast of the video image so the desired broadcast film appearance may be obtained. More specifically, in the '013 patent a gray scale modifier is used as a look-up table (LUT) and the operator can choose between a variety of curves (% light level vs. video level) stored in programmable read-only memory (PROM) to reflect different film types or achieve different photographic effects. The desired curve is selected by pressing a switch on the hardware.

U.S. Pat. Nos. 5,140,414; 5,374,954; 5,406,326; 5,457,491 and 5,687,011 (each issued to Mowry) represent a family of related post-production video technology that seeks to arrive at an aesthetically acceptable simulation of the appearance that images originated on different motion picture film stocks would embody after telecine "flying spot scanner" transfer to video from taped high definition video originated images. One component of this prior art technology deals with the conversion of the video-originated material through a LUT that is based on color temperature of the scene lighting, scene brightness and selected f-stop setting. The conversion values in the LUT are derived by filming color charts and grey scale charts, obtaining a digital representation of the film component responses of the charts from telecine transfer of the film to videotape, and then charting the telecine-derived component responses against video originated images of the same charts under identical lighting conditions. Another component of this prior art technology allows for physically instilling selected film grain patterns to the video images. The final simulated video image is either recorded as a high definition signal, or converted to an NTSC signal and broadcast or displayed.

In the latter two of the aforementioned Mowry patents, the digitized video signal may be sent to a film recorder, which reproduces the component-modified images onto a selected, reversal film stock. The film is chemically processed with a film processor and then optically projected, or scanned to video, digital video, or other electronic media. If the film recording option is employed, these patents specify that it is important that the telecine-derived LUT used in the component modification involves response data which compensates for the inherent color response of the film stock on which the images are being digitally recorded.

Prior art also exists for generating a broadcast film appearance with video or digitally captured images, where the processing occurs inside of the camera. Specifically, setup cards have been described for beta- camcorders and also digital camcorders (see L. J. Thorpe et al, "The HDTV Camcorder and the March to Marketplace Realty", *SMPTE Journal*, March 1998, pp. 164–177). These miniature plug-in setup cards facilitate prealignment of the camera to achieve an HD image having attributes similar to those that might otherwise be created from a film origination followed by telecine transfer to HD video. The setup cards can be pre-programmed to store desired digital data settings for aesthetic choices to be made concerning, among other characteristics, color reproduction, tonal reproduction and skin-tone detail.

In a combined approach, U.S. Pat. No. 5,319,465 describes a method using modified camera production and modified post-production processes and equipment to create film-like images. Specifically, the method includes the steps of shooting a benchmark comprising a gray scale chart, a color test chart and two backfocus charts with both a film and a video camera with comparable scene lighting and depth of field. Once the film test benchmark is shot, the film is transferred to videotape utilizing a telecine apparatus, with settings indicative of an industry standard set-up film. The video camera image's hue, saturation, luminance and gamma levels are manipulated to color correct the video camera image to look visually like the transferred film image. After the videotape has been edited, the videotape undergoes color correction in which the videotape benchmark is corrected to match the film test benchmark.

The aforementioned prior art is generally trying to emulate the look of film after it has been telecine-transferred to video. This is desirable to some extent because the telecine system does have some film attributes when broadcasted. However, the prior art neglects the emulation of the look of film origination, as if a negative film has been directly printed and projected through a motion picture system. This is particularly desirable where the digital output is recorded on film for projection. Where the prior art does deal with film recording, as in the latter two of the above-mentioned Mowry patents, it does so in the context of a telecine-transferred benchmark. Moreover, when the prior art alters the tone scale and color of a video or digitally captured image to emulate a film, it is done on the telecine-transferred benchmark. This is an imperfect alteration because it cannot operate upon the scene exposure as seen by a film.

Copending, commonly-assigned U.S. Ser. No. 09/712,500, entitled "System and Method for Processing Electronically Captured Images to Emulate Film Tonescale and Color", filed Nov. 14, 2000 in the names of K. M. Cirulli, J. C. Brewer and N. M. Rodriguez, provides a system and method for rendering electronically captured images to emulate the appearance in tonescale and color of images captured with motion picture film, and subsequently printed onto another motion picture film and displayed theatrically (negative-positive system). The tonescale and color of an electronically captured image is altered only after it has been shifted to emulate scene exposure as seen by film. Then the shifted electronic exposures are mapped through a predetermined LUT and matrix that imparts a film tonescale and color to the electronically captured image. This method is advantageous because it allows for automation of the image processing with predetermined algorithms. In addition, it does not require color-timing decisions to be made by an operator on a per scene basis, if the video or digital camera set-ups remain constant.

Other prior art also exists for manipulation of digital images to emulate a particular "look". U.S. Pat. Nos. 5,809,164 and 5,239,370 both describe a color management system for characterizing and re-mapping colors. Both describe the ability to re-map the colors in a linear and non-perceptual process. U.S. Pat. No. 4,839,721 teaches that transformation between a capture medium the selected color is essentially a linear response.

The prior art generally cited above describes the conversion of an electronically captured image from an electronic camera to data that can be written to a film recorder and subsequently printed. Ideally, as represented in the Cirulli et al application Ser. No. 09/712,500, the image chain allows for a match between the print generated by this process and a print from a film captured scene ("print" as used herein refers to the final transparency used for projection).

What is needed is a system that converts a scanned film image into data that can be displayed on an electronic display device, such as a digital projector, and still look like a projected film image. The projected digital image would correctly replicate the look of film origination, particularly as to film tonescale and color reproduction, as if a negative film has been directly printed and projected through a motion picture system.

SUMMARY OF THE INVENTION

An object of the present invention is to digitally manipulate an image sequence to make it suitable for cinema motion picture display.

A further object is to digitally manipulate the tone scale and color reproduction to match the appearance of a motion picture release print or a suitably desired photographic "look".

The present invention is directed to overcoming one or more of the problems set forth above. Briefly summarized, according to one aspect of the present invention, a method for processing a sequence of digital image signals in order to match the appearance of a particular display medium, such as a motion picture print film, includes the steps of (a) converting the digital image signals into signal values in an analytical dye amount space where the signal values are proportional to a dye set corresponding to the particular medium; and (b) converting the signal values in analytical dye amount space into output values suitable for a display device, such as a digital projector. Moreover, the signal values in analytical dye amount space may be corrected for viewing conditions, such as printing flare, gamma, contrast ratio or neutrality.

In a further aspect of the invention, the step of converting the signal values in analytical dye amount space into output values further includes the steps of: converting the signal values in analytical dye amount space into a perceptual color space based upon a chosen illuminant for display of the image signals; and converting the signals in the perceptual color space into output values suitable for a display device. Furthermore, the invention further includes the step of re-mapping any output values that are out of the gamut of the display device.

ADVANTAGES OF THE INVENTION

This invention is a straightforward, reliable, and practical process for converting digital image sequences so that their appearance matches that of projected motion picture print film. In addition, the technique can be used to assist capturing of image sequences.

This invention provides a standard process for digital cinema presentation. The process can be employed not only at projection, but also at capture. Current industry methods are time consuming, inconsistent, and unpredictable. Colorists spend countless hours each year to adjust image sequences in order to match a desired output response. This invention provides a fast and reliable process for matching a digital source to a motion picture print film release. It therefore greatly minimizes the work involved by a colorist to adjust the flesh tone and colorimetry of image sequences, therefore saving time and enabling the use of digital cinema projection.

This invention provides the control and flexibility to be put in use in digital cinema projection. This invention transforms the digital image sequence by simulating a "film model" for characterizing how film dyes appear when viewed with light. The film dye amounts are then converted and mapped to the target digital projector. Any out of gamut colors are remapped in perceptual color space to minimize the color appearance to the viewer.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because video or digital image processing systems that emulate the look of motion picture film, particularly after telecine conversion, are well known, the present description will be directed in particular to attributes forming part of, or cooperating more directly with, a system and a method in accordance with the present invention. Attributes not specifically shown or described herein may be selected from those known in the art. In the following description, a preferred embodiment of the present invention would ordinarily be implemented at least in part as hardware, although those skilled in the art will readily recognize that the equivalent of such hardware may also be designed in software. Given the system as described according to the invention in the following materials, hardware and software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program. If the invention is implemented in hardware, it may be implemented as an integrated circuit, such as an application specific integrated circuit (ASIC), or by other means known in the art.

This invention is designed to provide a straightforward and robust method for transforming and projecting digital data to replicate what is seen by conventional projected film release prints. Accordingly, the invention is designed to meet the following objectives:

Match the tone scale of image sequence A to image sequence B;

Match the colorimetry of image sequence A to image sequence B;

Match the perceived appearance of image sequence A to image sequence B; and

Minimize the manual work necessary to match image sequences being projected on various cinema digital projection systems, where image sequence A is digital data captured of the original scene and image sequence B is a motion picture print film projected under a normal cinema environment with a normal, conventional projector system. Image sequence A could have been scanned from the original negative film or an inter-positive print, or directly obtained from a digital capture device or from computer generated graphics. The viewing conditions for image sequence A are the same as for image sequence B, i.e., that of a normal cinema environment. When image sequence A is projected next to image sequence B, the sequences will appear to be perceptually the same. This invention also eliminates the need to manually adjust the color and tone scale of the digital data to match the print film. This advantage greatly minimizes the efforts of a colorist to match digital image sequences to film release prints.

The core of this invention is a mathematical process that transforms input digital image data into another digital metric that is suitable to be projected on a digital projector or a CRT display device. The objective is to obtain a "target look" in the viewing environment, such as the "look" of a motion picture print film. Beginning with FIG. 1, this invention is shown to involve the digital transformation of a sequence of digital images that relate to an original scene. In the preferred embodiment, the original scene is captured on a photographic element 10, such as motion picture negative film, and the sequence of digital images is produced by scanning the photographic element, or an inter-positive print film derived from the photographic element, with a motion picture film scanner, such as a telecine 15. Although photographic film is the preferred originating element, the invention equally pertains to digital origination, namely, where the initial digital image is either a computer generated image or a digitally originated capture of the scene, such as would be provided by a digital camera. The digital image data from the sequence of digital images is digitally transformed according to a particular computer model 20 implemented in a digital processor 25. One form of digital transformation is to produce the desired "look" on a digital display device such as a CRT monitor 30, which generates images for direct viewing, or a digital projector 35, which projects sequential frames of cinemagraphic digital data onto a screen 40. Projectors suitable for this purpose are generally available, and include the DLP Projector offered by Texas Instruments Corporation and the G4000 Projector offered by JVC Corporation. The computer model 20 also involves re-mapping any colors that are not achievable with the chosen display device into ones that are displayable.

Figure 1:
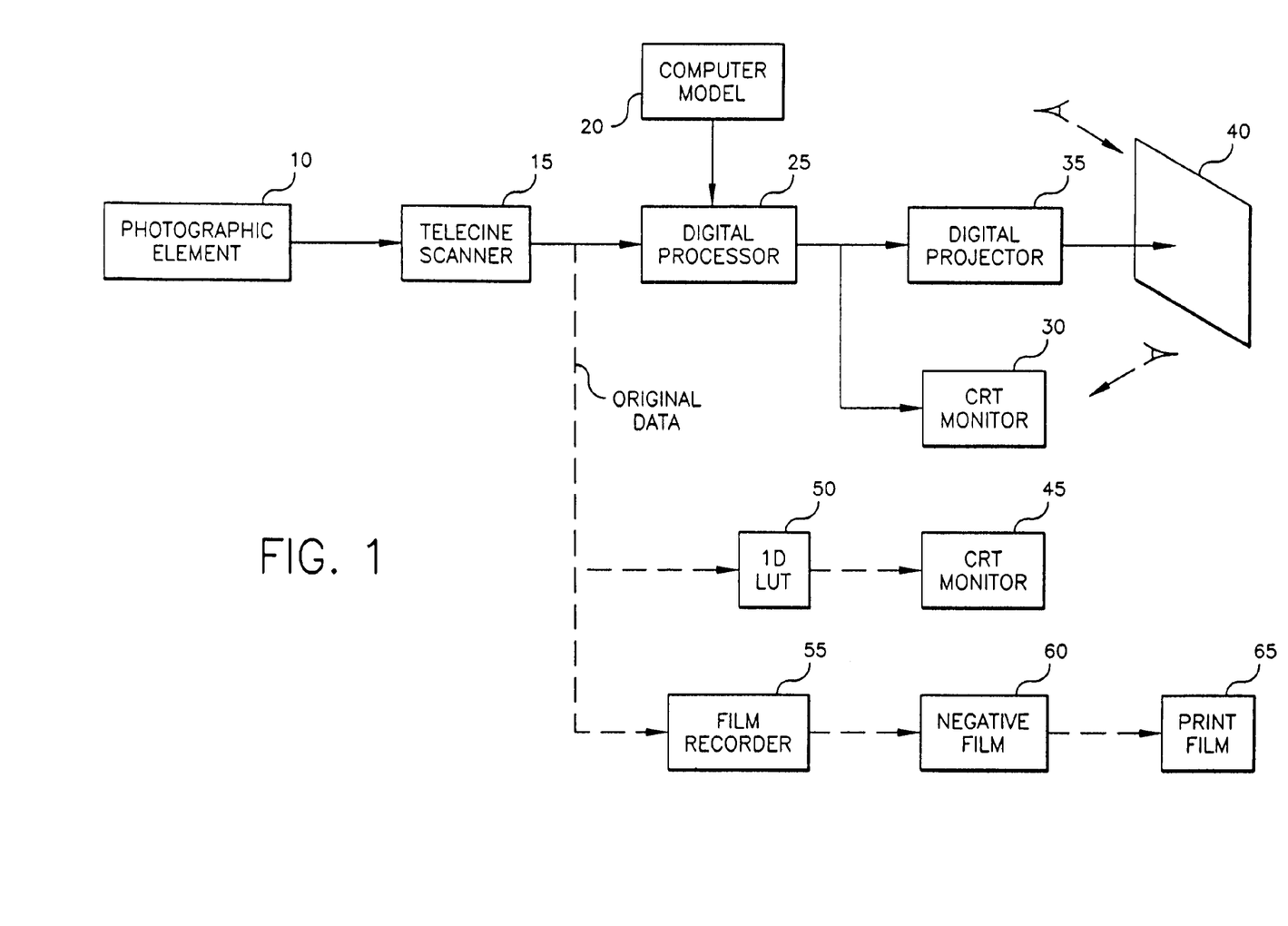
FIG. 1 is a block diagram of a digital cinema processing system according to the invention.

As mentioned above, the desired "look" is preferably that of a motion picture print film projection system. There are different ways of trying to get this "look", or something approximating this "look". The original data from the telecine scanner 15 may be displayed on a CRT 45 calibrated to simple 1D look up tables (LUT) 50 that impart the "film tone scale"; however, this technique is an approximation at best since it can get the neutral scale close but it fails on the color scale. Alternatively, the original data may be written by a film recorder 55 to a film element 60 as a negative that is subsequently printed onto motion picture print film 65, which inherently provides the correct "film look". In either case, the output system is designed to include, or approximate, the characteristics of the motion picture print film. The original data, consequently, is devoid of the characteristics of the motion picture print film projection system. Another way to obtain this "look", which is the subject of this invention, is to specify photographic parameters in the computer model 20 that achieve a representation of a motion picture print film projection system. Any changes in the "look" that is different from the "standard film look" will then appear in the data as a perturbation that achieves the desired result on the "standard film output".

Figure 2:
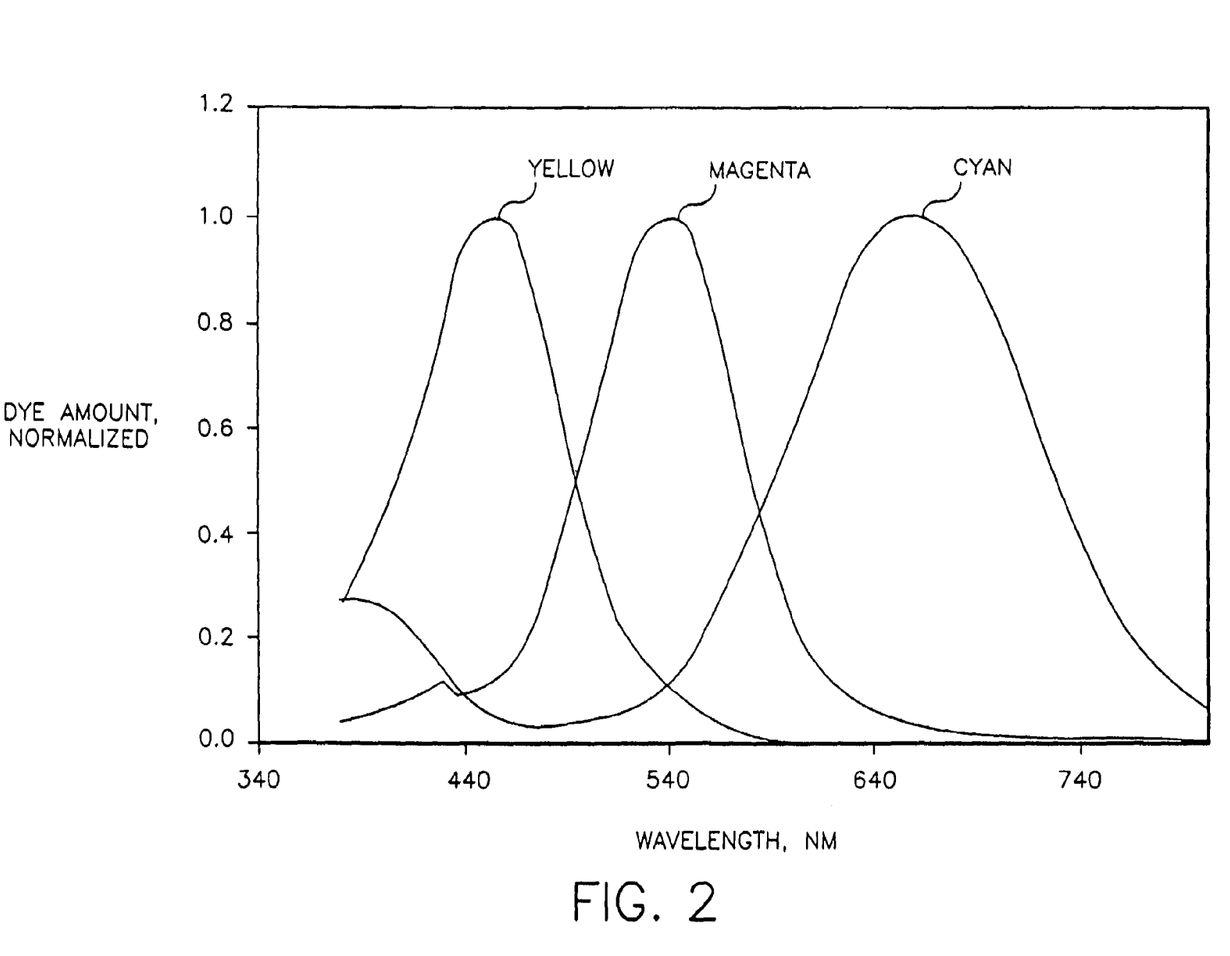
FIG. 2 is a representation of a typical dye set for a motion picture print film.
Figure 3:
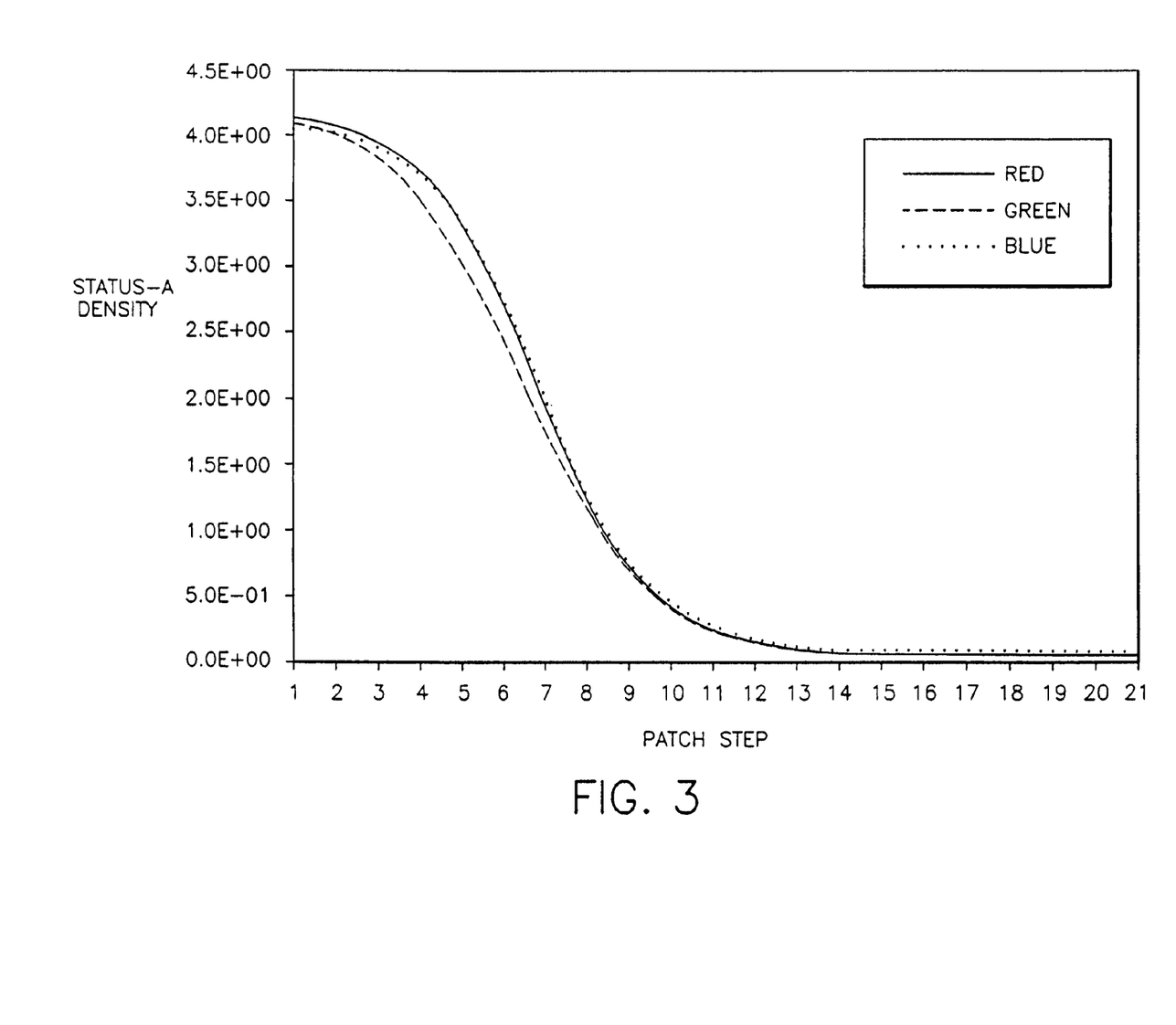
FIG. 3 is a representation of a Density Log Exposure curve set or a control neutral exposure step series of a typical motion picture print film.

The target "look" is achieved by mathematical modeling of the input to output data, which is embodied in the computer model 20. The calculations rely upon some physical measurements such as a target dye set spectrophotometry (which is illustrated by FIG. 2) and target tone scale curves (which are illustrated by FIG. 3). For example, FIGS. 2 and 3 illustrate the dye set and tone scale characteristics of Kodak Vision Print Film #2383. The motion picture print film dye set curves (FIG. 2) are the spectra that, when combined will produce a unit neutral (achromatic visual density of 1.0) when viewed with an equal energy power distribution spectrum. These curves are then assigned the values of 1.0, 1.0, 1.0 and are therefore normalized to the equal energy power distribution spectrum. A different power spectrum could be used for the normalization, however this only alters the definition of the 1.0 dye amount. This is the dye set for which the digital projection of the digital image sequences will be matched to. The density log exposure curve set (DLE series) shown in FIG. 3 is a control neutral exposure step series of a motion picture print film. The step series ranges from an exposure density of 0.0 to 2.0 (or possibly 0.0 to 3.0 or other range) to produce the $D_{max}$ to $D_{min}$ of the print film. The values are measured in RGB terms of Status-A Density and are converted and manipulated in Analytical Dye Amount space.

In an important aspect of the invention, the tone scale and tone scale manipulations are operated on in a channel independent space, preferably a space referred to herein as an Analytical Dye Amount space. This space assures the orthogonality of the operations. Analytical dye amounts are linear proportions of the individual cyan, magenta and yellow dye spectrophotometry. The target "look" for a film based emulation is constructed from the appearance of the image made from cyan, magenta and yellow dyes.

The choice of Analytical Dye Amount space allows the balancing (shifting) of the tone scale curves without imparting errors due to cross talk between the channels. Consequently, this invention uses analytical densities to transform a digital image sequence to the target film model. Since imparting a film look is necessarily a non-linear operation, the inventive transformation is not linear nor does it need to be a linear combination between the capture medium and the selected output color space. Furthermore, out of gamut colors (input defined colors that can not be accurately displayed on the output display device) are remapped in such a way to minimize the perception of color change. The output display device is a red, green and blue primary device. Consequently, this invention also treats the difficulties in the transformation between a subtractive (CMY) and an additive (RGB) system.

The image processing sequence starts with digitized data that corresponds to logarithmic printing densities. These printing densities are the exposure densities to a motion picture print material. The modeling incorporates multiple characteristics of the print, printing and viewing process. The states of these characteristics determine the desired "look" obtained. Many choices are presented that affect the result, such as balance position, print exposure flashing, gamma alteration, achromatic vs. non-achromatic tone scales, incomplete or skipped bleaching and display device dynamic range. The internal representation of the colorimetric state of a RGB input triad is matched to the display device primaries and tone scale characteristics. If a color is not achievable (out of gamut), it is gracefully molded into the domain of achievable colors without imparting artificial artifacts in the appearance in the image.

Figure 4:
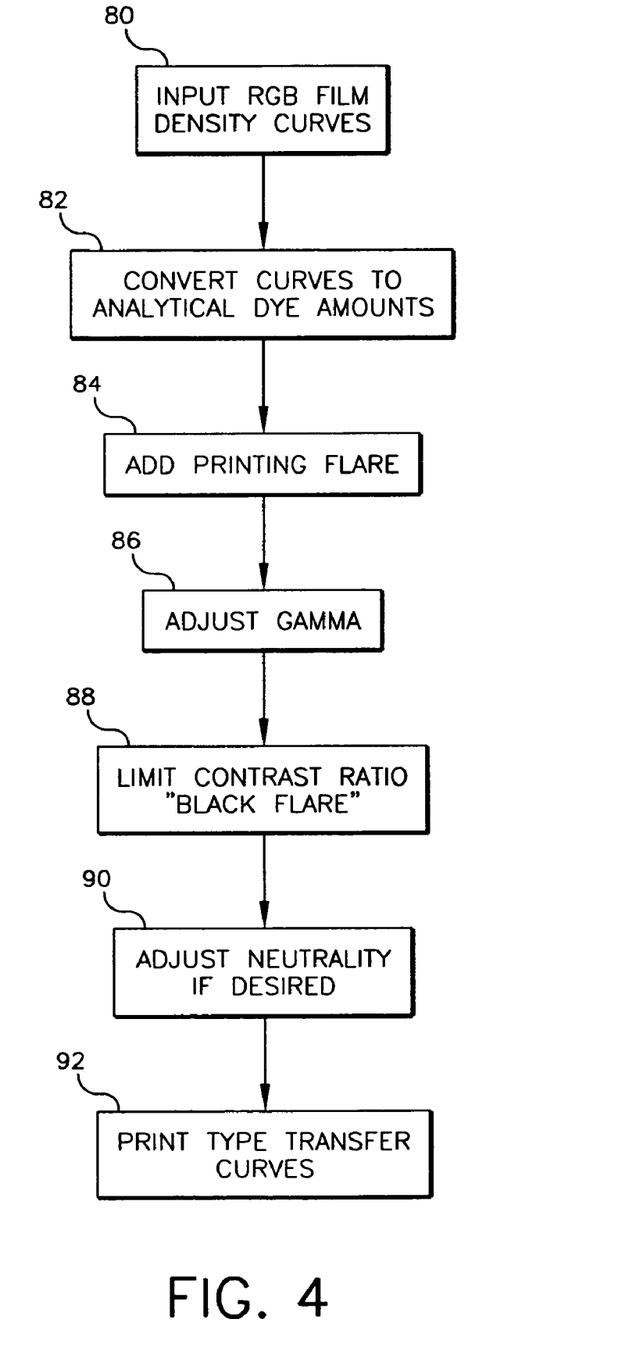
FIG. 4 is a chart showing the generation of the print type transfer curves used in the processing system shown in FIG. 1.

The first step is the construction of the final density log exposure (DLE) curves, as shown in FIG. 4, from an input Status-A density series. The input Status-A RGB motion picture print film density curves 80, e.g., the density log exposure (DLE) series shown in FIG. 2, are converted in a density conversion stage 82 to analytical dye amounts (AD). Analytical dye amounts refer to the proportional amount of dye needed to produce a particular RGB density. The status-A conversion to analytical dye amounts is explicit via a hard dye match of the status-A values. Though the conversion is not exactly linear, practice has shown that a 3×3 matrix provides a simple and good estimation of the trans lation. The following example is of a typical film dye set (specifically, for Kodak Vision Print Film #2383).

$$\begin{bmatrix} RAD \\ GAD \\ BAD \end{bmatrix} = \begin{bmatrix} 0.3260 & -0.0402 & -0.0287 \\ -0.338 & 0.3859 & 0.3166 \\ -.0017 & -0.0361 & 0.3677 \end{bmatrix} * \begin{bmatrix} RStatusA \\ GStatusA \\ BStatusA \end{bmatrix}$$

Each instance of a different dye set and viewing light source combination requires another unique matrix, which can be readily computed by those of ordinary skill in these arts. The preferred method is the explicit calculation of the AD values from status-A values.

The DLE series contains a step patch that is used as a control patch for adjusting color during film printing. The color timing of the print is adjusted to match a particular target. This target is normally referred to as LAD (the laboratory aim density patch). The Status-A RGB density position is 1.09, 1.06, and 1.03. These values are the Kodak Vision Print Film #2383 dye set Status-A RGB densities that are required to achieve a visual neutral density of 1.0 with a standard motion picture projector light source. The digital DLE series is also adjusted to LAD. The Status-A LAD values are converted to analytical dye amounts before the adjustment is made. This provides a common starting point for calculating a model for any film print or negative.

If necessary the DLE series is then adjusted to account for viewing flare, print material exposure flashing and gamma changes in the system. For example, as also shown in FIG. 4, the DLE series may be adjusted in Analytical Dye Amount space in a printing flare addition stage 84 for highlights, in a gamma adjustment stage 86 for gamma changes, in a contrast ratio adjustment stage 88 for contrast ratio limitations ("black flare"), and in a neutrality adjustment stage 90 for neutrality changes without affecting tone scale. At this point the DLE series represents a non-achromatic curve shape of the data set. If an achromatic curve set is desirable, then the DLE series is reconstructed using the luminance (L*) of the current DLE series and setting the chrominance to zero (a*=b*=0). The final result is a set of print type transfer curves 92 that are used in the image processing chain to be described in the following paragraphs.

Figure 5:
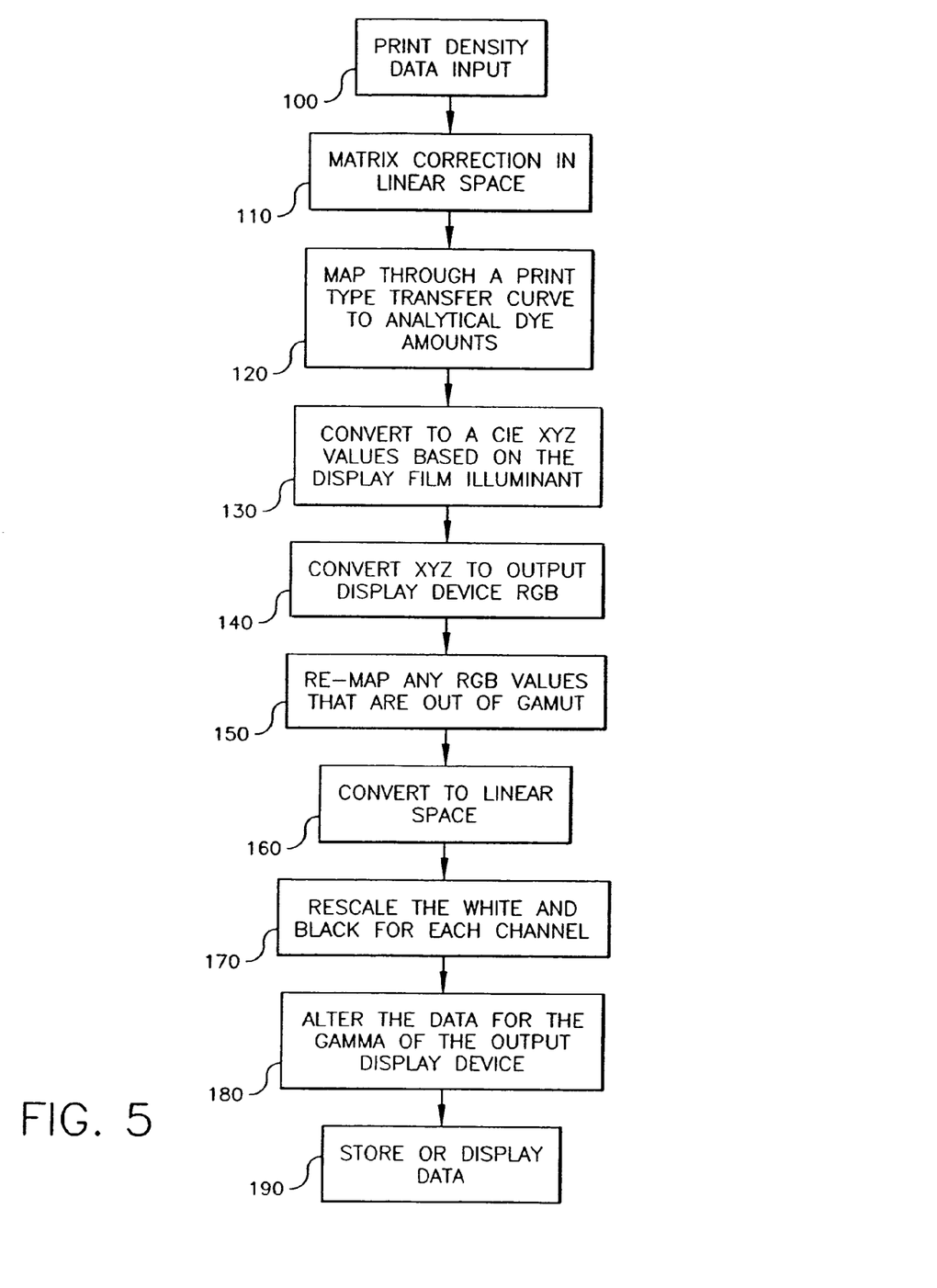
FIG. 5 is a chart showing the image processing chain incorporated in the system shown in FIG. 1.

A block diagram of the image processing chain for the conversion of image sequences provided by the scanner 15 is shown in FIG. 5. This chain is implemented as the computer model 20 in the processor 25. The input 100 from the telecine scanner 20 is a 10-bit log printing density sequence of image data. Although 10 bits are preferred, other bit depths may also be used. Since each image in the sequence is thus defined the same, a subsequent conversion may be the same for each image. A linear 3×3 color space conversion matrix 110 is applied to correct or adjust for the scanned image data position (e.g., linear exposure errors in scanning due to the spectral response of the sensing device). This correction is necessitated because the spectral response of a typical scanner is not identical to the spectral response of the motion picture print film. These corrections thus bring the input image data back into aim. To make these corrections, the image data is converted to linear space, the calculations are then made and then the image data is converted back to log space.

The image data is then mapped though the constructed DLE series (constructed according to FIG. 4) in a DLE mapping stage 120 and then to the chosen print film dye set. This operation is performed in Analytical Dye Amount space. The analytical dye amount data is converted in a dye conversion stage 130 to a perceptual color space, such as CIE XYZ color space, based upon a chosen film illuminant for the display environment. A 3×3 conversion matrix 140 then converts the CIE XYZ image to normalized linear digital projector RGB values.

At this point, if the digital projector RGB values are outside the data range then the desired color could not be directly mapped. A simple re-mapping technique would be to clip the RGB values to the minimum and/or maximum data range of the projector. The model according to this invention employs a more sophisticated re-mapping stage 150 for color re-mapping. The color re-mapping technique is described in detail in a subsequent section.

After the normalized linear digital projector RGB values are properly defined and obtained in a linear conversion stage 160, the RGB values are scaled in a rescale stage 170 to the actual bit depth of the projector. At this point the minimum and maximum data ranges are specified. The values do not have to be defined at minimum or maximum of the chosen bit depth. This allows for headroom in the system. The final gamma application stage 180 applies an inverse gamma function to the RGB data for the digital projector, as follows:

$$\gamma_{model} = \left(\left(\frac{RGB}{2^{bitdepth}-1}\right)^{\left(\frac{1}{\gamma_{projector}}\right)} * (2^{bitdepth}-1)\right)$$

The resulting display data 190 is typically stored in a storage device, such as a magnetic tape or DV-ROM, and subsequently transported to the display device, such as the digital projector 35 (see FIG. 1), which includes a memory reading device that recovers the display data from the storage device. Alternatively, the display data may be directly transmitted to the location of the digital projector, e.g., by a satellite transmission linkage. In either case, this would typically mean that the image processing chain is implemented at the location of the motion picture film scanner, or in some intermediary location. It is also possible for the image processing chain to be located at the digital projector, thus necessitating only transfer of the signals from the scanner to the projector location.

The color re-mapping method employed in the re-mapping stage 150 employs the following methodology when the color set is out of gamut. A RGB color set is out of color gamut if any of the following assumptions are true:

Any one or more of the RGB channels are below the target range (e.g., RGB<0)

Any one or more of the RGB channels are above the target range (e.g., 1023 (10 bit))

Clipping or re-mapping in absolute color space could reproduce a color that is nowhere near the original perceived color. This is due to the fact that sample steps between each color channel are not equal. Therefore the re-mapping must occur in perceptual color space.

Figure 6:
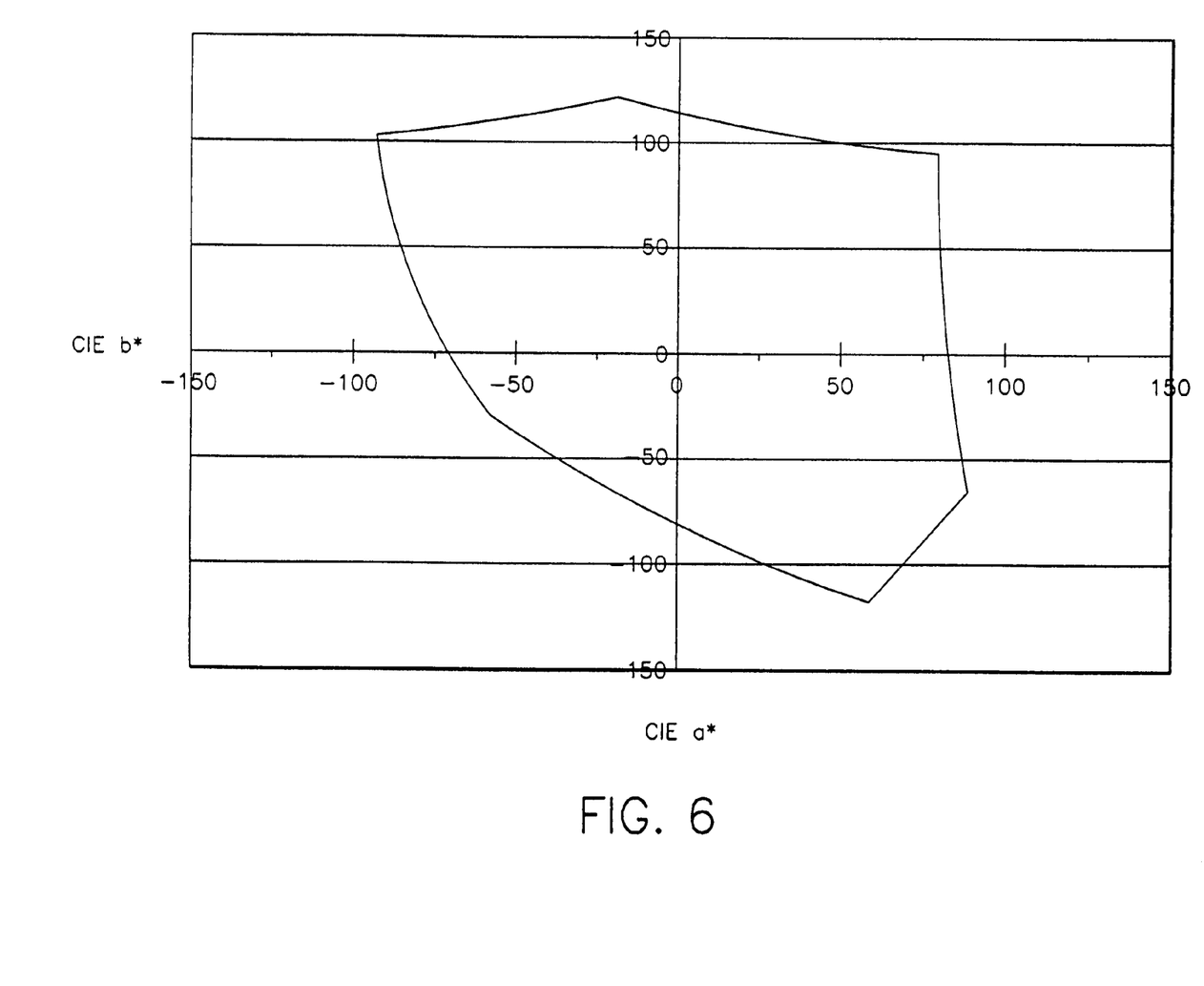
FIG. 6 represents the maximum digital projection saturation through the range of hue angles plotted as a* versus b* in CIE LAB space.
Figure 7:
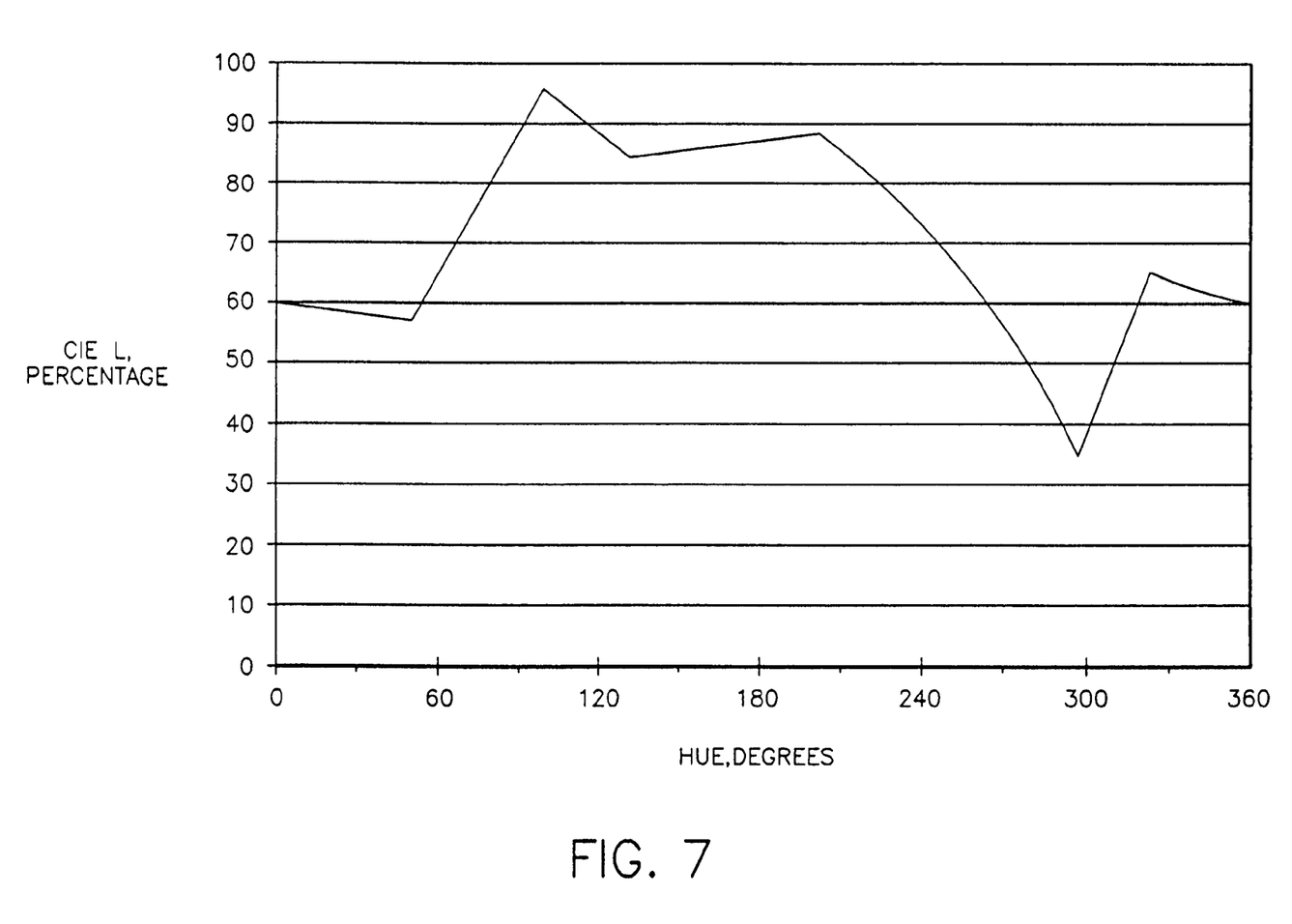
FIG. 7 represents the Lightness values (L) in CIE LAB space with the maximum digital projection saturation plotted through the range of hue angles (h).

First, the maximum color gamut of the system is determined in perceptual color space. The chosen perceptual color space is CIE LAB, which is well understood by those of skill in these arts, but any other perceptual color space, such as XYZ tristimulus or CIE LUV space, would work as well. These color spaces are device-independent color spaces that are designed to directly describe the color that is perceived by a human observer. They are generally based on the system developed by the Commission International de l'Eclairage (CIE). In CIE LAB space, the maximum color gamut is determined by setting the maximum saturation (in terms of the CIE LAB a* and b* coordinates) at each of the hue angles (as shown in FIG. 6, where the maximum saturation is shown by the solid line) and calculating the Lightness value (L) at each point (as shown in FIG. 7 for the CIE LAB L coordinate). The calculated Lightness value is used as a starting position for re-locating a color that is out of gamut.

Figure 8:
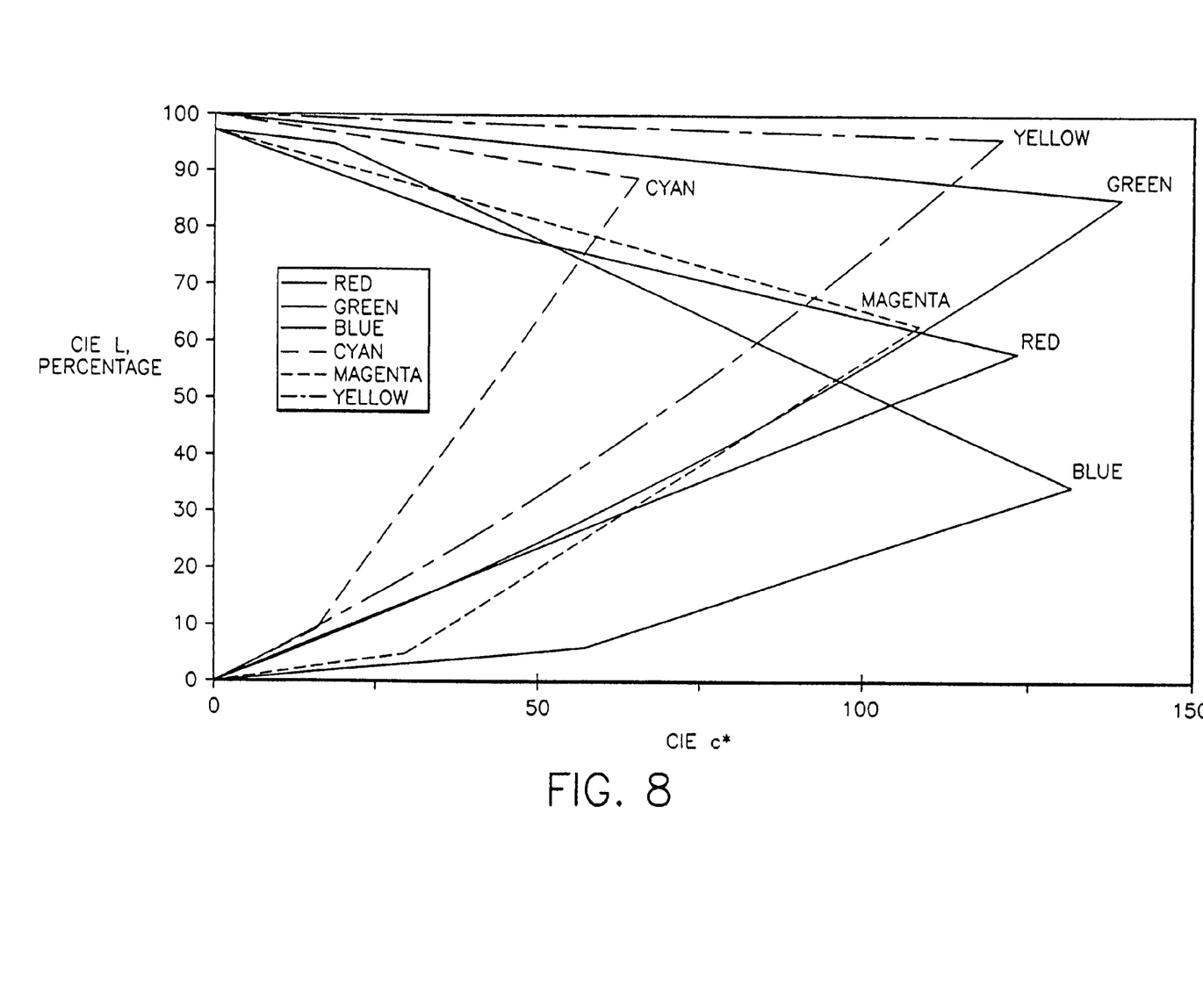
FIG. 8 represents the lightness values (L) profile of the primary (RGB) and secondary (CMY) colors of the digital projector.

Each color has a profile depending on the hue (as shown in FIG. 8, where c* is the vector distance of the a* b* coordinates from the origin). Merely setting the Lightness value to the mid point (50) would work for some colors (e.g., Red and Magenta) but not for others (e.g., Yellow and Blue). Therefore, the out of gamut color is first converted to CIE LAB color space and then to HSV (Hue, Saturation and Value) color space to obtain its hue angle. This hue angle is used to lookup the starting Lightness value for the working color.

The gamut remapping algorithm attempts to conserve the hue angle of the target color. Perceptually, changes in hue angle are more apparent than changes in lightness or saturation. Since the hue angle is maintained, the lightness and saturation must be altered to bring the target color into the display device color space. The hue angle profiles (FIGS. 7 and 8) indicate the lightness at the maximum saturation for each hue angle. If the target color is lighter than the maximum saturation lightness, then the target color is darkened and desaturated to intersect with the display device color space. If the target color is darker than the maximum saturation lightness, then the target color is lightened and desaturated to intersect with the display device color space.

While the foregoing gamut mapping technique is preferred, other gamut mapping techniques may be used in this imaging chain to assign valid RGB code values to otherwise undisplayable colors.

As described earlier, the image processing chain shown in FIG. 5 can be represented as a mathematical model. For each RGB input set, there is a potential unique set of output RGB values defined by the mathematical model. The modeling processing is independent of implementation. For this work, a fast method of computation is needed to perform the conversion. A tetrahedral 3D interpolation method is used to simplify the amount of modeling calculations necessary to be made. Detailed information regarding a tetrahedral 3D interpolation can be found in commonly-assigned U.S. Pat. No. 4,992,861, which is issued to John D'Errico and incorporated herein by reference.

Figure 9:
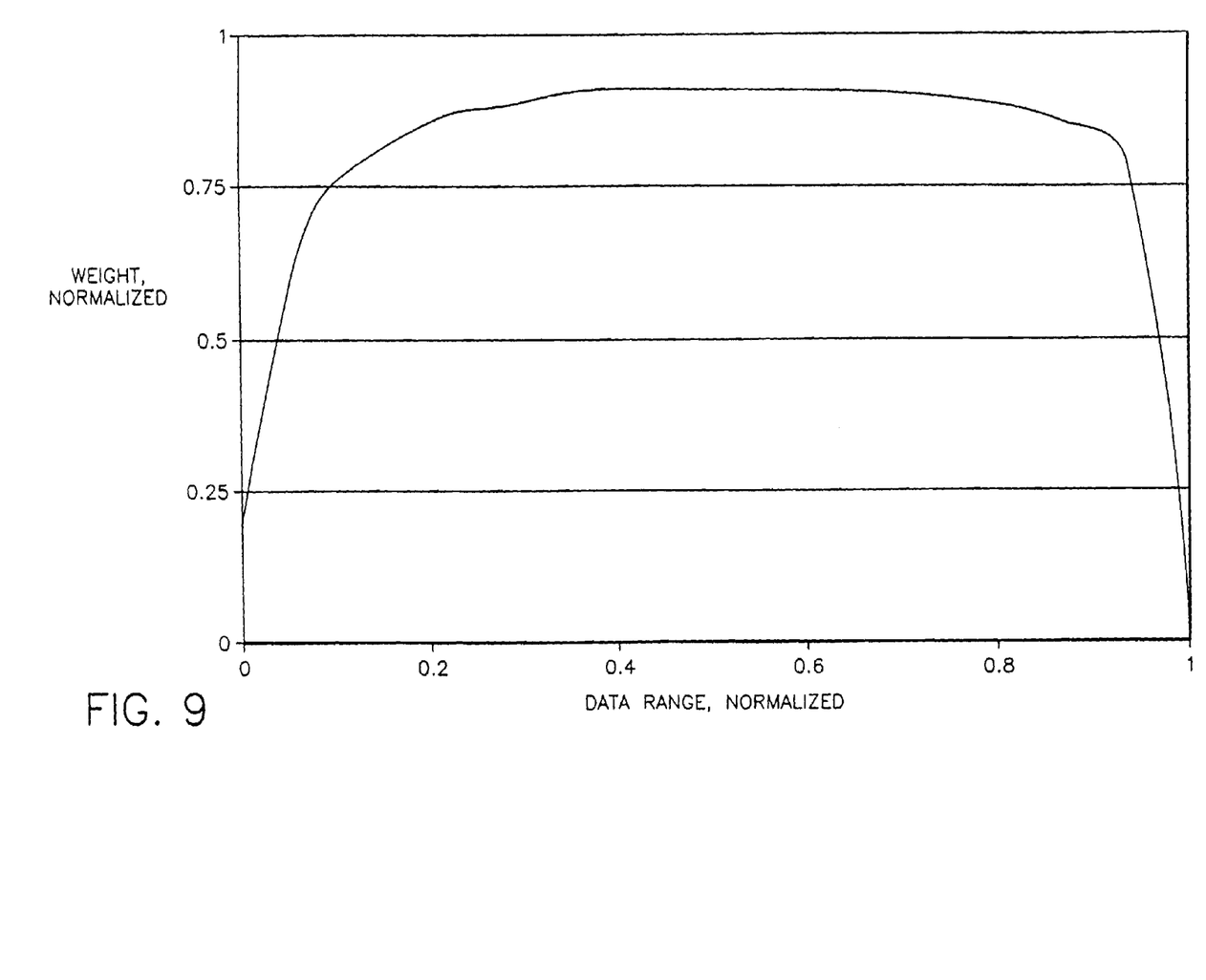
FIG. 9 is the tetrahedral 3D interpolation node distribution of the model film print.

The modeling values were calculated at various reference points in the system. These reference points are referred to as nodes in such tetrahedral 3D interpolation calculations. A node is referred to as a set of RGB values. For example, if a system has a 17 node set, the combination would $17^3$ or 4913 values. Values that don't fall on a node are then interpolated. The nodes were also generated to be non-equal distance throughout the system. The incremental change in code values from one node to the next was smaller in the middle region of the code value range. This allowed finer accuracy in the region where changes in the luminance are visually more sensitive. (see FIG. 9, which shows the 3D LUT node concentration). The modeling calculations are pre-processed at the node reference points and written as a file to the computer model 20 (see FIG. 1). At runtime, the file is loaded into a lookup table in the processor 25 and is referenced as the data is passed through it.

The invention has been described with reference to a preferred embodiment. However, it will be appreciated that variations and modifications can be effected by a person of ordinary skill in the art without departing from the scope of the invention.

PARTS LIST

- 10 photographic element
- 15 telecine
- 20 computer model
- 25 digital processor
- 30 CRT monitor
- 35 digital projector
- 40 screen
- 45 CRT monitor
- 50 1D LUTs
- 55 film recorder
- 60 film element
- 65 motion picture print film
- 80 RGB film density curves
- 82 density conversion stage
- 84 printing flare stage
- 86 gamma adjustment stage
- 88 contrast ratio adjustment stage
- 90 neutrality adjustment stage
- 92 print type transfer curves
- 100 print density data input
- 110 conversion matrix
- 120 DLE mapping stage
- 130 dye conversion stage
- 140 space conversion matrix
- 150 re-mapping method
- 160 linear conversion stage
- 170 rescale stage
- 180 gamma application stage
- 190 display data

What is claimed is:

1. A method for processing a sequence of digital image signals in order to match the appearance of a particular print film when the image signals are displayed, said method comprising the steps of:
   converting the digital image signals into signal values in print material analytical dye amount space where the signal values are proportional to a print dye set corresponding to the particular print film; and
   converting the signal values in the print material analytical dye amount space into output values suitable for a display device.

2. A method as claimed in claim 1 wherein the signal values in the print material analytical dye amount space are corrected for viewing conditions.

3. The method as claimed in claim 2 wherein the step of correcting the signals for viewing conditions includes correcting for at least one of printing flare, gamma, contrast ratio and neutrality.

4. A method as claimed in claim 1 wherein the step of converting the signal values in the print material analytical dye amount space into output values further includes the steps of:
   converting the signal values in the print material analytical dye amount space into a perceptual color space based upon a chosen illuminant for display of the image signals; and
   converting the signals in the perceptual color space into output values suitable for the display device.

5. A method as claimed in claim 1 further including the step of re-mapping any output values that are out of the gamut of the display device.

6. The method as claimed in claim 1 wherein the display device is a digital projector.

7. The method as claimed in claim 1 wherein the steps are performed by a 3D look up table based upon a tetrahedral interpolation.

8. A method for processing a sequence of digital image signals in order to match the appearance of a particular print film when the image signals are displayed on a digital display device, said method comprising the steps of:
   providing the sequence of digital image signals;
   converting the digital image signals into signal values in print film analytical dye amount space where the signal values are proportional to a print film dye set corresponding to the particular print film;
   converting the signal values in the print film analytical dye amount space into signals in a perceptual color space based upon a chosen illuminant for display of the image signals;
   converting the signals in the perceptual color space into output values suitable for a digital display device;
   re-mapping any output values that are out of the gamut of the digital display device into re-mapped output values; and
   providing the output values, including any re-mapped values, to the digital display device.

9. The method as claimed in claim 8 further comprising the steps of:
   normalizing the re-mapped display values in a linear conversion stage, thereby providing normalized display values;
   rescaling the normalized display values to a bit depth of the display device, thereby providing rescaled display values;
   applying an inverse gamma function to the rescaled display values, thereby providing gamma corrected display values; and
   providing the gamma corrected display values to the digital display device.

10. The method as claimed in claim 8 wherein the digital display device is a digital projector.

11. The method as claimed in claim 8 wherein the digital display device is a CRT monitor.

12. The method as claimed in claim 8 wherein the step of providing the output values, including any re-mapped values, to the digital display device comprises storing the output values on a storage medium that is subsequently provided to the digital display device.

13. The method as claimed in claim 8 wherein the step of providing the sequence of image signals comprises scanning a motion picture film with a motion picture film scanner in order to generate print density image signals.

14. The method as claimed in claim 13 wherein the step of converting the image signals into the print film analytical amount space comprises mapping the print density image signals through a print type transfer curve to obtain analytical dye amounts, wherein the print type transfer curve is constructed by
   providing density log exposure curves for the motion picture print film;
   converting the density log exposure curves into print film analytical dye amounts in the print film analytical dye amount space;
   correcting the signals in the print film analytical dye amount space for viewing conditions; and
   forming a print type transfer curve from the corrected signals.

15. The method as claimed in claim 14 wherein the step of correcting the signals includes correcting for at least one of printing flare, gamma, contrast ratio and neutrality.

16. The method as claimed in claim 8 further comprising the steps of:
normalizing the re-mapped display values in a linear conversion stage, thereby providing normalized display values;
rescaling the normalized display values to a bit depth of the digital display device, thereby providing rescaled display values;
applying an inverse gamma function to the resealed display values, thereby providing gamma corrected display values; and
providing the gamma corrected display values to the digital display device.

17. A method for processing a sequence of digital image signals in order to match the tone scale and color of a particular motion picture print film when the image signals are digitally projected, said method comprising the steps of:
scanning motion picture film to provide the sequence of digital image signals;
converting the image signals through a tone scale curve into signal values in print film analytical dye amount space where the signal values are proportional to a print film dye set corresponding to the particular motion picture print film;
converting the signal values in analytical dye amount space into signals in a perceptual color space based upon a chosen illuminant for display of the image signals;
converting the signals in the perceptual color space into output values suitable for a digital projector;
re-mapping any output values that are out of the gamut of the digital projector; and
providing the re-mapped values to the digital projector.

18. The method as claimed in claim 17 wherein the step of providing the output values, including any re-mapped values, to the digital projector comprises storing the output values on a storage medium that is subsequently provided to the digital projector.

19. The method as claimed in claim 17 wherein the step of converting the image signals into print film analytical amount space comprises mapping the image signals through a print type transfer curve to obtain print film analytical dye amounts, wherein the print type transfer curve is constructed by
providing density log exposure curves for the motion picture print film;
converting the density log exposure curves into print film analytical dye amounts in the print film analytical dye amount space;
correcting the signals in print film analytical dye amount space for viewing conditions; and
forming a print type transfer curve from the corrected signals.

20. The method as claimed in claim 19 wherein the step of correcting the signals includes correcting for at least one of printing flare, gamma, contrast ratio and neutrality.

21. A transformation for transforming a sequence of digital image signals in order to match the appearance of a particular print film when the image signals are displayed by a digital display device, said transformation being modeled by (a) conversion of the digital image signals into signal values in the print film analytical dye amount space where the signal values are proportional to a dye set corresponding to the particular and (b) conversion of the signal values in the print film analytical dye amount space into output values suitable for the digtal display device.

22. The transformation as claimed in claim 21 wherein the modeled conversions are performed by a 3-dimensional look up table.

23. The transformation as claimed in claim 22 wherein the 3-dimensional look up table is based upon a tetrahedral interpolation.

24. A 3-dimensional look up table populated with input and output values that achieve the transformation modeled in claim 21.

25. The 3-dimensional look up table as claimed in claim 24 wherein the look up table is based upon a tetrahedral interpolation.

26. The transformation as claimed in claim 21 wherein the digital display device is a digital projector.

27. A transformation as claimed in claim 21 wherein the signal values in the print film analytical dye amount space are corrected for viewing conditions.

28. The transformation as claimed in claim 27 wherein the correction for viewing conditions includes correcting for at least one of printing flare, gamma, contrast ratio and neutrality.

29. The transformation as claimed in claim 21 wherein the conversion of the signal values in the print film analytical dye amount space into output values is further modeled by:
converting the signal values in the print film analytical dye amount space into a perceptual color space based upon a chosen illuminant for display of the image signals; and
converting the signals in the perceptual color space into output values suitable for a digital display device.

30. The transformation as claimed in claim 21 further including a re-mapping of any output values that are out of a gamut of the digital display device.

* * * * *